US012632966B2

(12) United States Patent
Liu et al.

(10) Patent No.: US 12,632,966 B2
(45) Date of Patent: May 19, 2026

(54) METHOD, ELECTRONIC DEVICE, AND COMPUTER PROGRAM PRODUCT FOR RECOGNIZING OBJECT REGIONS IN IMAGE

(71) Applicant: Dell Products L.P., Round Rock, TX (US)

(72) Inventors: Zhisong Liu, Shenzhen (CN); Zijia Wang, Weifang (CN); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 18/340,515

(22) Filed: Jun. 23, 2023

(65) Prior Publication Data

US 2024/0404068 A1 Dec. 5, 2024

(30) Foreign Application Priority Data

Jun. 2, 2023 (CN) .......................... 202310652243.2

(51) Int. Cl.
*G06T 7/12* (2017.01)
*G06T 5/77* (2024.01)
(Continued)

(52) U.S. Cl.
CPC .................. *G06T 7/12* (2017.01); *G06T 5/77* (2024.01); *G06T 7/13* (2017.01); *G06V 10/25* (2022.01);
(Continued)

(58) Field of Classification Search
CPC ... G06T 7/10–194; G06T 11/60; G06T 11/40; G06T 7/12; G06T 5/77;
(Continued)

(56) References Cited

U.S. PATENT DOCUMENTS

| | | | | |
|---|---|---|---|---|
| 2018/0089505 A1* | 3/2018 | El-Khamy | ................ | G06T 7/73 |
| 2018/0253622 A1* | 9/2018 | Chen | ........................ | G06N 3/08 |

(Continued)

FOREIGN PATENT DOCUMENTS

| | | | | | |
|---|---|---|---|---|---|
| CN | 109429078 A | * | 3/2019 | ............. | G06V 20/40 |
| JP | 2005063196 A | * | 3/2005 | ............. | G06T 3/403 |

OTHER PUBLICATIONS

Jiao, Y., Wang, X., Wang, W., & Li, S., Image semantic segmentation fusion of edge detection and AFF attention mechanism, 2022, Applied Sciences, 12(21), 11248. (Year: 2022).*

(Continued)

*Primary Examiner* — Andrew W Bee
*Assistant Examiner* — Emma E Dryden
(74) *Attorney, Agent, or Firm* — Ryan, Mason & Lewis, LLP

(57) ABSTRACT

Embodiments of the present disclosure provide a method, an electronic device, and a computer program product for recognizing object regions in an image. The method includes detecting edges in an image based on pixels in the image. The method further includes segmenting the image into a plurality of semantic regions based on semantics of objects in the image. The method further includes recognizing, based on the edges and the plurality of semantic regions, object regions covering the objects. In this way, the positions of objects including graphic elements in the image and the tags of the objects can be automatically recognized, thus improving the efficiency of subsequent processing of the image.

20 Claims, 8 Drawing Sheets

(51) Int. Cl.

| | |
|---|---|
| *G06T 7/13* | (2017.01) |
| *G06V 10/25* | (2022.01) |
| *G06V 10/42* | (2022.01) |
| *G06V 20/40* | (2022.01) |
| *G06V 20/62* | (2022.01) |

(52) U.S. Cl.
CPC ............. *G06V 10/42* (2022.01); *G06V 20/41* (2022.01); *G06V 20/62* (2022.01); *G06T 2207/10016* (2013.01); *G06T 2207/20036* (2013.01); *G06T 2207/20081* (2013.01); *G06T 2207/20084* (2013.01); *G06V 2201/07* (2022.01)

(58) Field of Classification Search
CPC ... G06T 7/13; G06T 7/70; G06T 2207/30204; G06T 2207/20036; G06T 2207/10016; G06T 2207/20081; G06T 2207/20084; G06T 7/11; G06T 7/73; G06V 10/26; G06V 10/44; G06V 10/764; G06V 10/774; G06V 10/82; G06V 20/62; G06V 20/70; G06V 20/41; G06V 10/84; G06V 30/10; G06V 30/153; G06V 10/25; G06V 10/70; G06V 10/22; G06V 2201/07; G06V 10/40; G06V 10/42; G06F 16/48; G06F 16/3338; G06F 16/9024; G06F 16/36; G06F 16/3344; G06F 16/5866; G06N 5/022

See application file for complete search history.

(56) References Cited

U.S. PATENT DOCUMENTS

| | | | | |
|---|---|---|---|---|
| 2019/0174151 A1* | 6/2019 | Tsukagoshi | ........ | H04N 21/4725 |
| 2019/0340437 A1* | 11/2019 | Smith, IV | .............. | G06V 20/41 |
| 2024/0104806 A1* | 3/2024 | Braghin | .................. | G06T 11/40 |
| 2024/0265690 A1* | 8/2024 | Anandkumar | ......... | G06V 10/82 |

OTHER PUBLICATIONS

Qin, L., Shivakumara, P., Lu, T., Pal, U., & Tan, C. L., Video scene text frames categorization for text detection and recognition, Dec. 2016, In 2016 23rd International Conference on Pattern Recognition (ICPR), IEEE, pp. 3886-3891. (Year: 2016).*

Sung, T. L., & Lee, H. J., Depth edge detection using edge-preserving filter and morphological operations, 2020, International Journal of System Assurance Engineering and Management, 11(4), 812-817. (Year: 2020).*

Jain, R., Sankar, K. P., & Jawahar, C. V., Interpolation based tracking for fast object detection in videos, Dec. 2011, In 2011 Third National Conference on Computer Vision, Pattern Recognition, Image Processing and Graphics (pp. 102-105), IEEE. (Year: 2011).*

Shivakumara, P., Raghavendra, R., Qin, L., Raja, K. B., Lu, T., & Pal, U., A new multi-modal approach to bib number/text detection and recognition in Marathon images, 2017, Pattern Recognition, 61, 479-491. (Year: 2017).*

Duan, L., Liu, J., Yang, W., Huang, T., & Gao, W. (2020). Video coding for machines: A paradigm of collaborative compression and intelligent analytics. IEEE Transactions on Image Processing, 29, 8680-8695. (Year: 2020).*

X. Zhou et al., "EAST: An Efficient and Accurate Scene Text Detector," IEEE Conference on Computer Vision and Pattern Recognition (CVPR), Jul. 2017, pp. 5551-5560.

K. Wang et al., "End-to-End Scene Text Recognition," International Conference on Computer Vision, Nov. 2011, 8 pages.

M. Liao et al., "Scene Text Recognition from Two-Dimensional Perspective," The Thirty-Third AAAI Conference on Artificial Intelligence, Feb. 2019, pp. 8714-8721.

M. Jaderberg et al., "Reading Text in the Wild with Convolutional Neural Networks," arXiv:1412.1842v1, Dec. 4, 2014, 20 pages.

B. Shi et al., "An End-to-End Trainable Neural Network for Image-based Sequence Recognition and Its Application to Scene Text Recognition," arXiv:1507.05717v1, Jul. 21, 2015, 9 pages.

B. Shi et al., "ASTER: An Attentional Scene Text Recognizer with Flexible Rectification," IEEE Transactions on Pattern Analysis and Machine Intelligence, vol. 41, No. 9, Sep. 2019, 14 pages.

D. Yu et al., "Towards Accurate Scene Text Recognition with Semantic Reasoning Networks," IEEE/CVF Conference on Computer Vision and Pattern Recognition (CVPR), Jun. 2020, pp. 12113-12122.

S. Fang et al., "Read Like Humans: Autonomous, Bidirectional and Iterative Language Modeling for Scene Text Recognition," IEEE/CVF Conference on Computer Vision and Pattern Recognition (CVPR), Jun. 2021, pp. 7098-7107.

A. Graves et al., "Connectionist Temporal Classification: Labelling Unsegmented Sequence Data with Recurrent Neural Networks," Proceedings of the 23rd International Conference on Machine Learning, Jun. 2006, 8 pages.

P. Isola et al., "Image-to-Image Translation with Conditional Adversarial Networks," IEEE Conference on Computer Vision and Pattern Recognition (CVPR), Jul. 2017, pp. 1125-1134.

T.-C. Wang et al., "High-Resolution Image Synthesis and Semantic Manipulation with Conditional GANs," IEEE/CVF Conference on Computer Vision and Pattern Recognition, Nov. 30, 2017, pp. 8798-8807.

C. Gao et al., "SketchyCOCO: Image Generation from Freehand Scene Sketches," IEEE/CVF Conference on Computer Vision and Pattern Recognition (CVPR), Jun. 2020, pp. 5174-5183.

Y. Lu et al., "Image Generation from Sketch Constraint Using Contextual GAN," European Conference on Computer Vision, Sep. 2018, 16 pages.

C. Saharia et al., "Palette: Image-to-Image Diffusion Models," SIGGRAPH '22 Conference Proceedings, Aug. 2022, 10 pages.

J. Yu et al., "Free-Form Image Inpainting with Gated Convolution," IEEE/CVF International Conference on Computer Vision (ICCV), Nov. 2019, pp. 4471-4480.

N. Kumar et al., "Robust One Shot Audio to Video Generation," IEEE/CVF Conference on Computer Vision and Pattern Recognition Workshops (CVPRW), Jun. 2020, 10 pages.

P.-T. Yang et al., "Diverse Audio-to-Image Generation via Semantics and Feature Consistency," Proceedings, APSIPA Annual Summit and Conference, Dec. 2020, pp. 1188-1192.

M. Zelaszczyk et al., "Audio-to-Image Cross-Modal Generation," arXiv:2109.13354v1, Sep. 27, 2021, 10 pages.

R. Rombach et al., "High-Resolution Image Synthesis with Latent Diffusion Models," Proceedings of the IEEE/CVF Conference on Computer Vision and Pattern Recognition, Jun. 2022, pp. 10684-10695.

C. Saharia et al., "Photorealistic Text-to-Image Diffusion Models with Deep Language Understanding," arXiv:2205.11487v1, May 23, 2022, 46 pages.

F. Perazzi et al., "A Benchmark Dataset and Evaluation Methodology for Video Object Segmentation," IEEE Conference on Computer Vision and Pattern Recognition (CVPR), Jun. 2016, pp. 724-732.

S. Hoffstaetter, "Python-tesseract: pytesseract 0.3.10," https://pypi. org/project/pytesseract/, Aug. 16, 2022, 8 pages.

A. Dutta et al., "VGG Image Annotator (VIA)," https://www.robots. ox.ac.uk/~vgg/software/via/, Accessed Jun. 23, 2023, 6 pages.

A. Dutta et al., "The VIA Annotation Software for Images, Audio and Video," arXiv:1904.10699v3, Aug. 9, 2019, 8 pages.

* cited by examiner

200

202

Detecting edges in an image based on pixels in the image

204

Segmenting the image into a plurality of semantic regions based on semantics of objects in the image

206

Recognizing, based on the edges and the plurality of semantic regions, object regions covering the objects

METHOD, ELECTRONIC DEVICE, AND COMPUTER PROGRAM PRODUCT FOR RECOGNIZING OBJECT REGIONS IN IMAGE

RELATED APPLICATION

The present application claims priority to Chinese Patent Application No. 202310652243.2, filed Jun. 2, 2023, and entitled "Method, Electronic Device, and Computer Program Product for Recognizing Object Regions in Image," which is incorporated by reference herein in its entirety.

FIELD

Embodiments of the present disclosure relate to the field of computers and, more specifically, to a method, an electronic device, and a computer program product for recognizing object regions in an image.

BACKGROUND

Today, videos are one of the most common and popular types of data on the Internet, and are widely applied in many fields such as entertainment, production, and communication. In many cases, users want to be able to edit videos to create desired video content. For example, some users may want to change a trademark in a video, block some advertisements, and update a TV logo. To do this, it is necessary to recognize the trademark in all image frames in the video, and then remove the trademark and replace it with a new one.

SUMMARY

Embodiments of the present disclosure provide a solution for recognizing object regions in an image.

In a first aspect of the present disclosure, a method for recognizing object regions in an image is provided. The method includes detecting edges in an image based on pixels in the image. The method further includes segmenting the image into a plurality of semantic regions based on semantics of objects in the image. The method further includes recognizing, based on the edges and the plurality of semantic regions, object regions covering the objects.

In a second aspect of the present disclosure, an electronic device is provided. The electronic device includes a processor and a memory coupled to the processor, the memory having instructions stored therein, wherein the instructions, when executed by the processor, cause the electronic device to perform actions. The actions include detecting edges in an image based on pixels in the image. The actions further include segmenting the image into a plurality of semantic regions based on semantics of objects in the image. The actions further include recognizing, based on the edges and the plurality of semantic regions, object regions covering the objects.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to recognize key features or main features of the present disclosure, nor intended to limit the scope of the present disclosure.

BRIEF DESCRIPTION OF THE DRAWINGS

By more detailed description of exemplary embodiments of the present disclosure, provided herein with reference to the accompanying drawings, the above and other objectives, features, and advantages of the present disclosure will become more apparent, wherein identical reference numerals generally represent identical components in the exemplary embodiments of the present disclosure. In the accompanying drawings.

DETAILED DESCRIPTION

Principles of the present disclosure will be described below with reference to several example embodiments illustrated in the accompanying drawings. Although illustrative embodiments of the present disclosure are shown in the accompanying drawings, it should be understood that these embodiments are described merely to enable those skilled in the art to better understand and then implement the present disclosure, and do not limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, in the event that a user wants to edit an object in a video, it is necessary to select a region of the image that covers the target object. Editing a video and creating new content typically require specialized video editing techniques. In conventional solutions, a video creator can use a text recognition model to recognize text regions in image frames of a video, but cannot detect image regions in the image frames. This greatly limits its applicability.

In view of this, embodiments of the present disclosure provide a solution for recognizing object regions in an image to solve one or more of the above problems and other potential problems. In this solution, edges in the image are first detected, and the image is segmented into a plurality of semantic regions based on the semantics of objects in the image. Thereafter, the edges and the semantic regions are integrated to determine object regions in the image that cover the objects. In this way, the positions of objects including graphic elements in the image can be automatically recognized, thus improving the efficiency of subsequent processing of the image.

Figure 1:
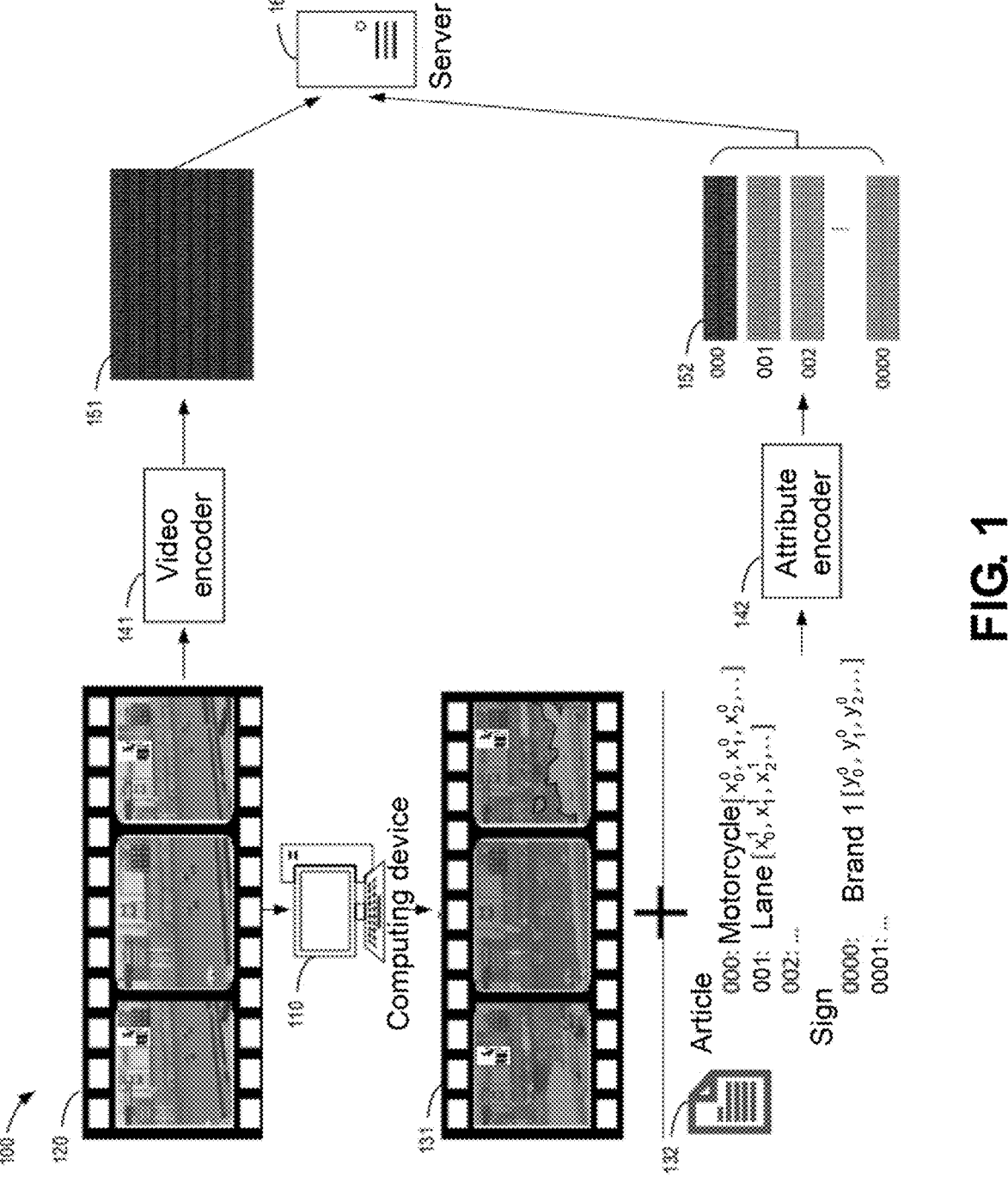
FIG. 1 is a schematic diagram of an example environment in which embodiments of the present disclosure may be implemented.

FIG. 1 is a schematic diagram of example environment 100 in which embodiments of the present disclosure may be implemented. As shown in FIG. 1, the example environment 100 includes a computing device 110 and a server 160. For example, an input video 120 including a plurality of image frames that comes from a user may be input to the computing device 110 on the one hand. The computing device 110 can extract image frames in the input video 120 and perform image processing on the image frames. On the other hand, the input video 120 may also be input to a video encoder 141, and converted by the video encoder 141 into code data 151.

In the embodiments shown in FIG. 1, after the image frames of the input video 120 are processed by the computing device 110, the processed image frames 131 in which object regions are segmented and attribute data 132 for objects in the video can be obtained. For example, in the image frames, motorcycle, lane, etc. under an article category and brand 1 under a sign category appear. The attribute data 132 includes a motorcycle numbered "000" and the coordinates of its corresponding object region. The attribute data 132 also includes a lane numbered "001" and the coordinates of its corresponding object region. In addition, the attribute data 132 also includes a brand 1 numbered "0000" and the coordinates of its corresponding object region. The brand 1 is recognized, for example, according to the text on the billboard in the image frame. The attribute data 132 is then input to an attribute encoder 142 to convert the attributes to code data 152 that can be easily stored. Both the code data 151 and the code data 152 are stored in server 160 for subsequent editing.

Figure 2:
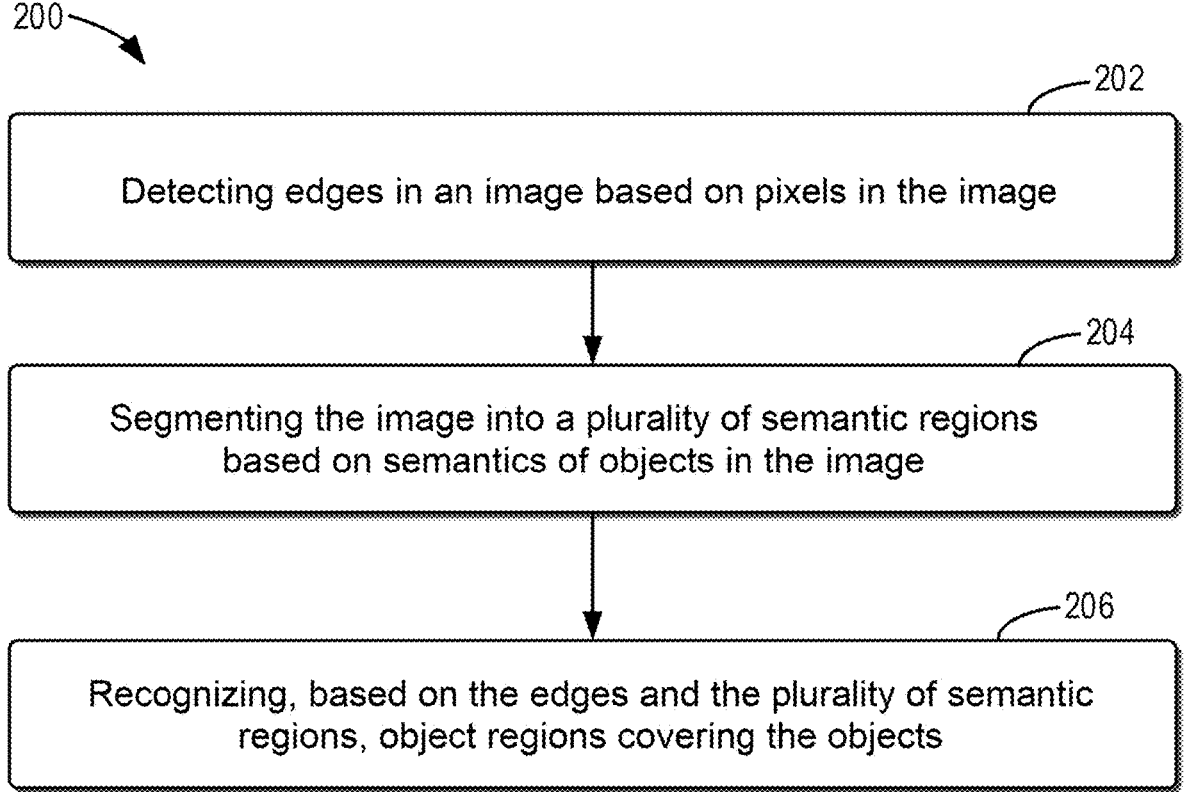
FIG. 2 is a flow chart of an example method for recognizing object regions in an image according to embodiments of the present disclosure.

FIG. 2 is a flow chart of an example method 200 for recognizing object regions in an image according to embodiments of the present disclosure. The method 200 may be performed by, for example, the computing device 110 in FIG. 1.

At 202, the computing device 110 detects edges in an image based on pixels in the image. The image is, for example, an image frame from a video input by the user. In image processing, an edge may be a curve of which the trend coincides with a path along which intensities are rapidly changed in the image, that is, differences between the pixels at the two sides of the edge are large, for example, the differences between the pixels at the two sides of the edge are greater than a certain threshold. The edges are typically associated with boundaries of targets in a scene. In some embodiments, when recognizing the edges in the image, the computing device 110 may detect the edges in the image based on the values of the pixels in the image according to a trained edge detection model.

At 204, the computing device 110 segments the image into a plurality of semantic regions based on semantics of objects in the image. The semantic segmentation is a classification at the pixel level. That is, all pixels belonging to the same class are grouped into one category, so semantic segmentation is used to understand the image from the pixel level. For example, pixels belonging to people in FIG. 1 are classified into one category, pixels belonging to motorcycles are classified into one category, and pixels belonging to a corresponding object in the image are classified into one category. In addition to this, there are also background pixels that are divided into one category. It should be noted that semantic segmentation is different from instance segmentation. For example, if there are multiple persons in a photo, for the semantic segmentation, the pixels of all the persons are grouped into one category, but the instance segmentation further needs to group the pixels of different persons into different categories. This means that the instance segmentation goes further than the semantic segmentation. Here, however, the semantic segmentation is sufficient to implement the solution according to embodiments of the present disclosure, thereby reducing the computational cost to some extent and thus enabling recognition of image frames in a video stream in real time.

In some embodiments, when segmenting the image into a plurality of semantic regions, the computing device 110 segments the image into a plurality of semantic regions based on the categories of the objects according to a semantic segmentation model. As a result, each semantic region obtained may have an outline associated with the corresponding object.

At 206, the computing device 110 recognizes, based on the edges and the plurality of semantic regions, object regions covering the objects. By comprehensively considering the edges and the corresponding semantic regions, it is possible to determine the semantic regions that include the graphical edges associated with the objects. In this manner, the edge detection and semantic segmentation enable the recognition of objects having graphical elements, which has higher flexibility and applicability compared with existing text recognition and detection and lower complexity and computational resource requirements compared with existing fine segmentation mechanisms.

In some embodiments, when recognizing the object regions, the computing device 110 can extract edge features of the edges and semantic features of the plurality of semantic regions, and then concatenate the edge features and the semantic features into global features. Finally, the computing device 110 can recognize the object regions based on the global features according to a trained classification model. The specific process for recognizing object regions in an image will be described in detail below with reference to FIGS. 3A and 3B.

Figure 3A:
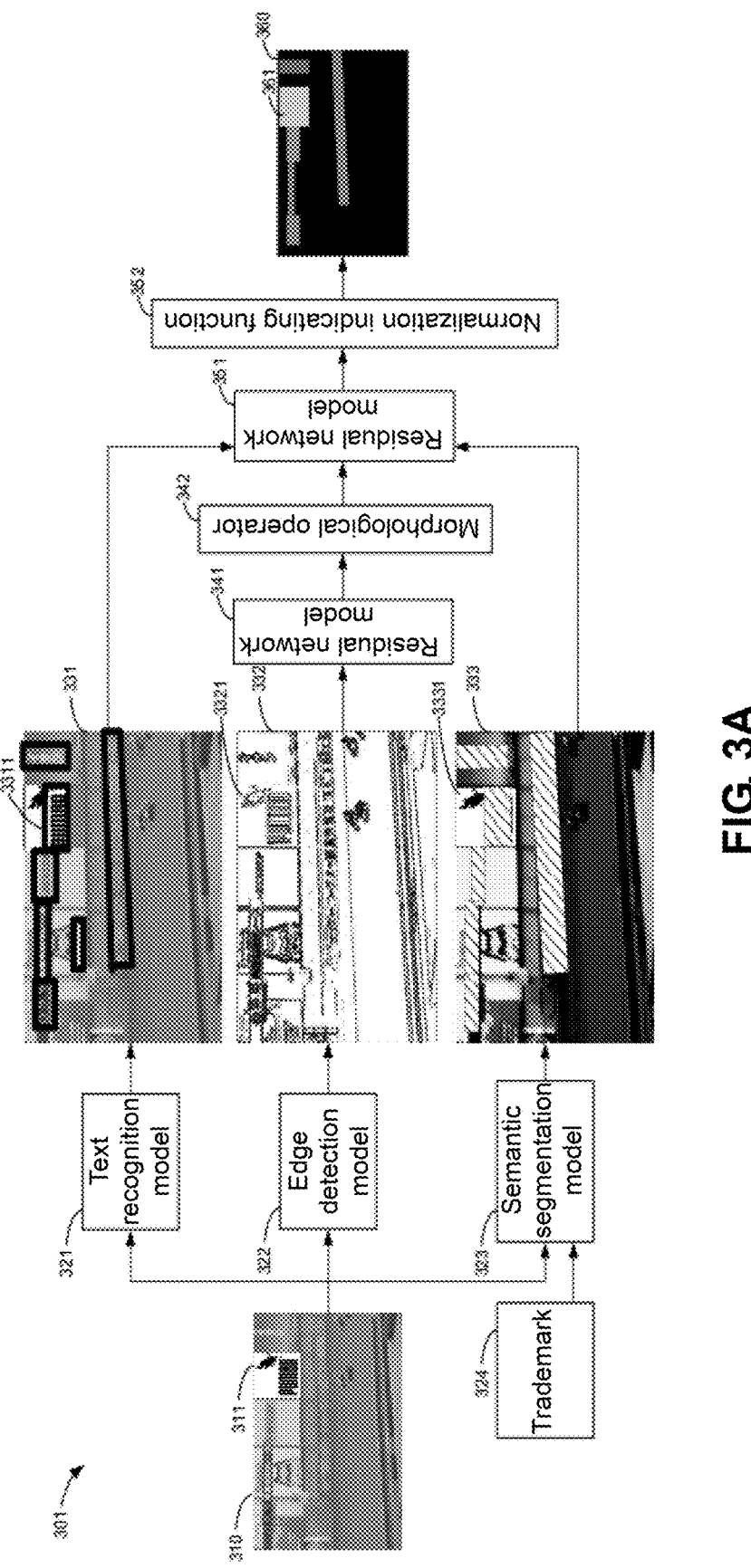
FIG. 3A is a schematic diagram of an example process for recognizing object regions in an image according to embodiments of the present disclosure.

FIG. 3A is a schematic diagram of an example process 301 for recognizing object regions in an image according to embodiments of the present disclosure. As shown in FIG. 3A, the process 301 may be performed by a corresponding module or model of the computing device 110. The computing device 110 receives an image 310 from a user. The image 310 includes an object 311. The object 311 is the logo of a trademark "PUMBA." Afterwards, the image 310 is input into each of three models in parallel for processing.

In one branch, the image 310 is input into a text recognition model 321 to detect the text in the image 310. In some embodiments, the text recognition model 321 may be any model that is capable of performing the text recognition function, for example, an optical character recognition (OCR) model. After the processing by the text recognition model 321, an image 331 is obtained. A plurality of text regions in the image 331 are surrounded by bounding boxes. In the embodiment shown in FIG. 3A, the graphics in the "PUMBA" logo are not detected, and only the text "PUMBA" 3311 in the logo is provided with a bounding box. The image 331 is input into a residual network model 351.

In another branch, the image 310 is input to an edge detection model 322 to detect the edges in the image 310. In some embodiments, the edge detection model 322 may be any model that is capable of performing the edge detection function, for example, an edge detection model. After the processing by the edge detection model 322, an image 332 is obtained. The image 332 includes only the edges and has no other colors. The graphical edges and text edges in a logo 3321 of "PUMBA" are detected and presented.

After the image 332 is obtained, the image 332 is input to a residual network model 341. After the processing by the residual network model 341, the features of the image 332 are extracted. After that, the extracted features are input to a morphological operator 342. The morphological operator 342 can, for example, perform erosion and dilation operations on the image 332 to make the edges continuous and enclosed. Here, the morphological transformation can be represented as:

$$y = V \oplus b - V \ominus b, \text{ where } b(x) = ReLU(|x|, \theta) \qquad (1)$$

where x indicates the feature; $V \oplus b$ indicates the dilation processing of V, and $V \ominus b$ indicates the erosion processing of V; ReLU indicates the activation function; and $\theta$ indicates the learnable threshold.

In this way, denoising of the image 332 is implemented. The denoised image 332 is input into the residual network model 351.

In the last branch, the image 310 is input to a semantic segmentation model 323 to perform semantic segmentation on the image 310. Here, an indication 324 for a trademark is also input to the semantic segmentation model 323. The indication 324 can improve the directionality of the semantic segmentation and facilitate segmentation of the region of interest. In some embodiments, the semantic segmentation model 323 may be a language-driven semantic segmentation (LSeg) model, or any model that is capable of performing semantic segmentation functions. After the processing by the semantic segmentation model 323, an image 333 is obtained. The objects in the image 333 that correspond to different semantics are segmented, for example, by different filling patterns (not illustrated in detail here). It can be seen that a logo 3331 of "PUMBA" is determined to have the semantic "trademark" and is thus filled with the same pattern as the other trademarks. Afterwards, the image 333 is input into the residual network model 351.

The image data that have been processed by each branch or the feature maps corresponding to the images are all input to the residual network model 351. In the residual network model 351, the features of the image 331, the features of the denoised image 332, and the features of the image 333 are first concatenated into global features and used as input. In this way, one image 310 has different features in three dimensions after being subjected to three different models. The results obtained after the processing by the residual network model 351 are input to a normalization indicating function 352. The normalization indicating function 352 may, for example, be a softmax function. Here, the residual network model 351 and the normalization indicator function 352 can be viewed as a classification model for performing recognition of objects in the image 310. After the processing by the normalization indicating function 352, an output result 360 is obtained. The output result 360 includes, for example, an object region 361 for the object 311 of the logo "PUMBA" in the image 310. Here, the object region 361 may be represented by a set of coordinates and used as a mask to perform subsequent operations. In addition, the output result 360 also includes the name "PUMBA" of the trademark in the object region 361.

In the embodiment shown in FIG. 3A, the computing device 110 includes the text recognition model 321, the edge detection model 322, the semantic segmentation model 323, the residual network model 341, the morphological operator 342, the residual network model 351, and the normalization indicating function 352. The models collaborate to form an overall architecture for object region detection. This overall architecture can be represented as:

$$y = softmax(R(concat[D(V), M(R(E(V))), L(V)])) \qquad (2)$$

where V indicates the input video; D indicates text recognition processing; E indicates edge detection processing; R indicates residual network processing; M indicates morphological transformation processing; L indicates semantic segmentation processing; concat indicates concatenation processing; and softmax indicates normalization indicating processing.

The text recognition model 321, the edge detection model 322, and the semantic segmentation model 323 may use fixed parameters without having to be trained, and in contrast, the residual network model 341, the morphological operator 342, and the residual network model 351 are trained to implement the object region recognition mechanism according to embodiments of the present disclosure.

Figure 3B:
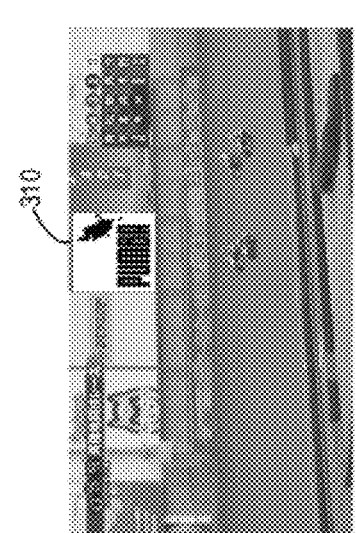
FIG. 3B is a diagram of the comparison of recognition results obtained using different methods.
Figure 3B:
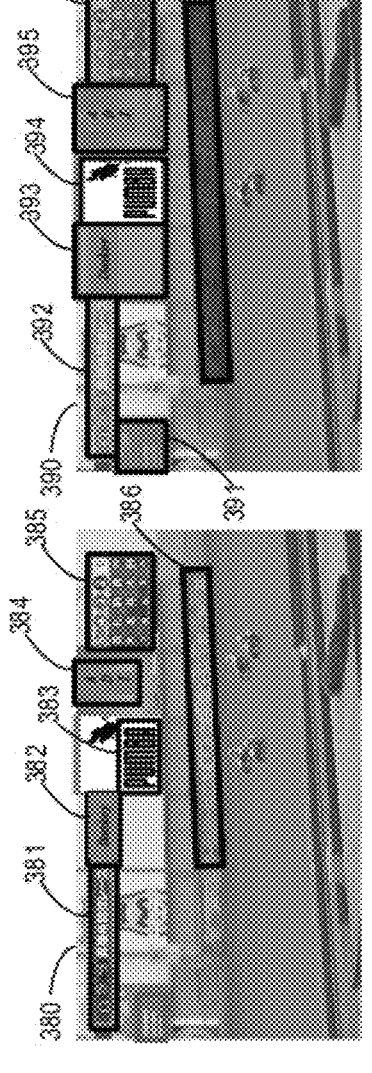
Figure 3B:
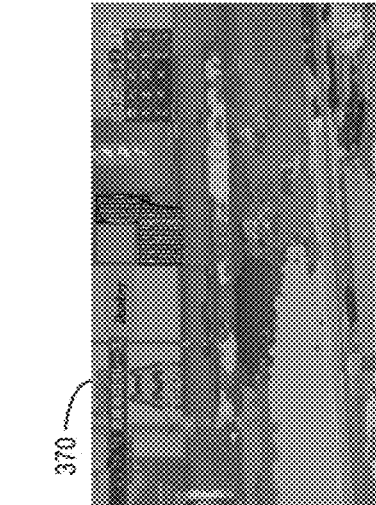

FIG. 3B is a schematic diagram of a comparison 303 between the original image and the recognition results obtained using different methods. As shown in FIG. 3B, the recognition result of the original image 310 after only semantic segmentation is an image 370. The image 370 includes a plurality of objects that are distinguished with different colors and have different semantics. However, the trademark on the advertising board at the side of the track is blurred and indistinguishable. The recognition result of the original image 310 after only text recognition is an image 380. The text in the image 380 is surrounded by bounding boxes to form text regions 381, 382, 383, 384, 385, and 386. In this embodiment, the text regions 382, 383, and 384 are only part of the trademarks corresponding thereto. For example, the object 311 includes an image portion in addition to the text portion, but the image portion of the object 311 is not included by the bounding boxes in the image 380. Likewise, the logo corresponding to the text region 382 has a solid color background in addition to the text "Donkey," but the background is not included in the bounding boxes.

The recognition result obtained after the original image 310 has been subjected to the object region recognition mechanism of embodiments of the present disclosure is an image 390. The image 390 includes object regions 391, 392, 393, 394, 395, 396, and 397 corresponding to the trademarks. In the image 390, the object regions 393, 394, and 395 completely cover the objects, and accurately recognize the complete trademarks in the image.

Figure 4A:
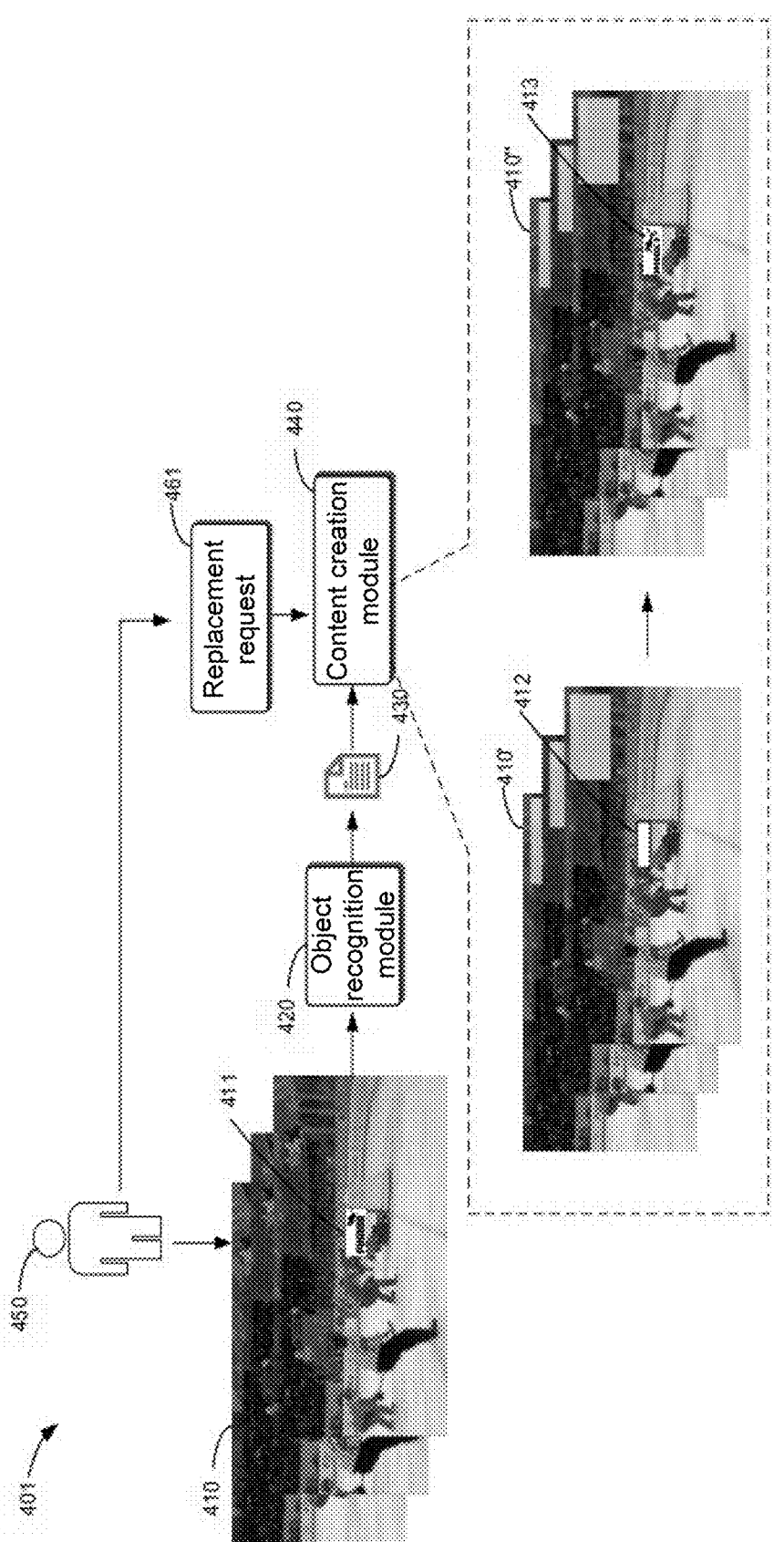
FIGS. 4A and 4B are schematic diagrams of an example process for creating content according to embodiments of the present disclosure.

After the input image is processed to recognize the object regions for the various objects of the input image, the resulting tags, coordinates, and masks of the various object regions can be used in image editing and content manipulation. FIG. 4A is a schematic diagram of an example process 401 for creating content according to embodiments of the present disclosure. The example process 401 may be executed, for example, by the computing device 110 in FIG.

7

1. As described in FIG. 4A, the computing device 110 receives an input video 410 from a user 450. The image frame of the input video 410 includes a logo 411 for the trademark "PUMBA." The input video 410 is input to an object recognition module 420 of the computing device 110. The object recognition module 420 may, for example, perform the method of recognizing object regions in an image as shown in FIG. 2, or include the text recognition model 321, the edge detection model 322, the semantic segmentation model 323, the residual network model 341, the morphological operator 342, the residual network model 351, and the normalization indicating function 352 as described in FIG. 3A and perform the process of recognizing object regions in an image as shown in FIG. 3A.

The object recognition module 420 extracts image frames from the input video 410 and processes the various image frames to obtain an execution result 430. The execution result 430 includes, for example, the coordinates of the logo 411 and the tag trademark "PUMBA," and the corresponding mask. The execution result 430 is input into a content creation module 440. Here, the user 450 inputs a replacement request 461 for the trademark "PUMBA" to the computing device 110. The replacement request 461 instructs the replacement of the "PUMBA" logo 411 with a "PUDEL" logo. After receiving the replacement request 461, the content creation module 440 removes the object region corresponding to the "PUMBA" logo 411 from each image frame of the input video 410 using the mask in the execution result to obtain an image 410'. The image 410' includes a blank region 412. Afterwards, the content creation module 440 fills the blank region 412 with the "PUDEL" logo 413 having the shape corresponding to that of the blank region 412 to obtain an image 410". In this manner, the user 450 can implement the desired operation simply by providing the input video 410 and inputting an operation request for the input video 410. In this manner, the intelligence of video editing is improved, and the user experience is substantially enhanced.

Figure 4B:
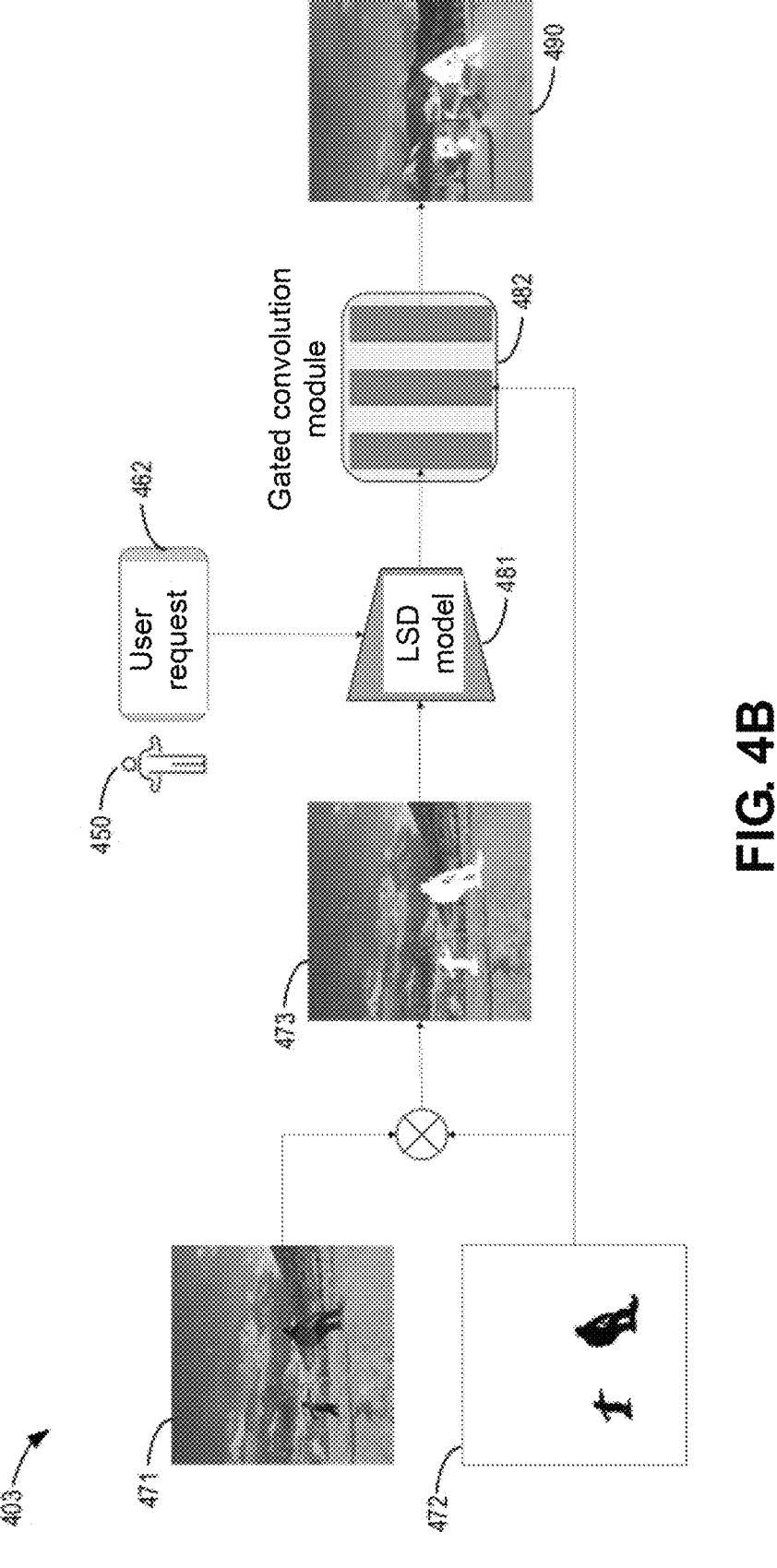

FIG. 4B is a schematic diagram of an example process 403 for creating content according to some other embodiments of the present disclosure. The example process 403 may be executed, for example, by the computing device 110 in FIG. 1. As illustrated in FIG. 4B, the content creation module 440 may, for example, be constructed on the basis of a latent stable diffusion (LSD) model. Here, the user 450 inputs an image 471 and instructs to replace the content of a target region 472 of interest in the image 471. The mask for the target region 472 can be obtained using the process shown in FIG. 3A. Afterwards, the computing device 110 uses the mask to remove the content within the target region in the image 471 to obtain an image 473. The image 473 is input into an LSD model 481. In addition, the user 450 also inputs a user request 462 for editing the image into the LSD model 481. For example, the user 450 requests that a house be added to the target region. After the LSD model 481 has performed the corresponding operation, the data is output to a gated convolution module 482 for further processing. The gated convolution module 482 uses the image and the mask to guide the convolution process, so it can ensure smooth and consistent structural changes over the entire image. After the processing by the gated convolution module 482, a content image 490 as created is obtained. The content image 490 includes a house that covers the corresponding region.

Figure 5:
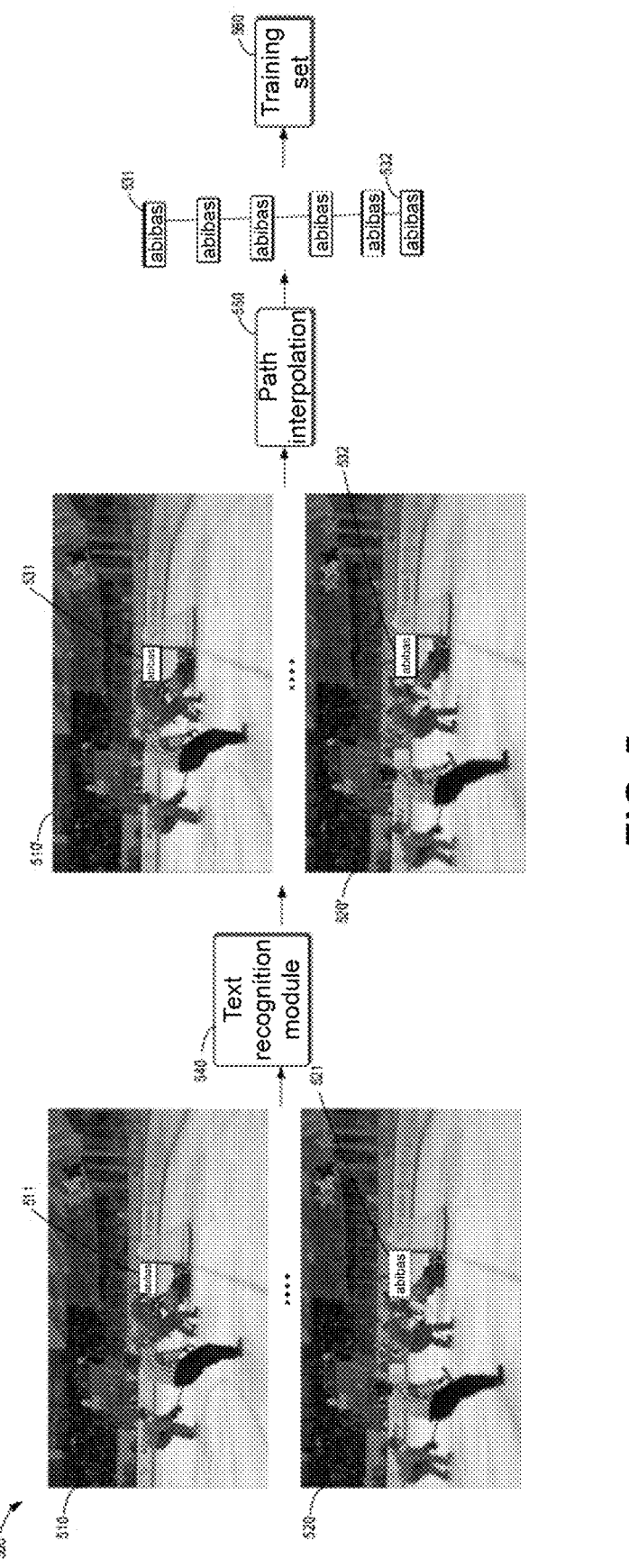
FIG. 5 is a schematic diagram of an example process for annotating image frames according to embodiments of the present disclosure.

In cases where there is a lack of training data for a specific domain, for example, in the case where there is currently a lack of a corresponding training set for trademark detection, a large amount of manually annotated training data needs to be collected in order to train a new machine learning architecture. In order to save labor costs, a mechanism is provided herein for labeling, based on two discontinuous image frames in a video, other image frames between the two image frames. FIG. 5 is a schematic diagram of an example process 500 for annotating image frames according to embodiments of the present disclosure. The process 500 is performed, for example, by the computing device 110 in FIG. 1. As shown in FIG. 5, the computing device 110 receives an input video including an image frame 510 and an image frame 520. Here, the image frame 510 is temporally earlier than the image frame 520, and a plurality of other image frames are also included between the image frame 510 and the image frame 520. The image frame 510 includes a logo 511 of the trademark "abibas" at the first position, and the image frame 520 includes a logo 521 of the trademark "abibas" at the second position. Since the logo 521 has only a text region, the image frame 510 and the image frame 520 are input to a text recognition module 540 to recognize the positions of the logo in the image frames. It should be understood that the logo of the trademark "abibas," as the object of recognition, is only an example, and that in addition to the text, the object of recognition may also include graphics, and when the object of recognition has a graphic element, the image frame may be input to the semantic segmentation module for recognition. After the processing by the text recognition module 540, an image frame 510' in which the logo is recognized with a bounding box 531 and an image frame 520' in which the logo is recognized with a bounding box 532 are obtained. In the described embodiments, because of the short time interval between the image frame 510 and the image frame 520, the displacement of the logo 511 with respect to the logo 521 can be regarded as resulting from the logo performing a rectilinear motion. Afterwards, the image frame 510' and the image frame 520' are input to a path interpolation module 550. Based on the position of the bounding box 531 in the image frame 510', the position of the bounding box 532 in the image frame 520', and the rectilinear motion path, the path interpolation module 550 can determine the positions of the logo of the trademark "abibas" in a plurality of image frames between the image frame 510 and the image frame 520 by means of the following relational equation:

$$t_i = t_s + (i-s)(t_e - t_s) \times N \qquad (3)$$

where i indicates the ith image frame; s indicates the sth image frame that serves as the initial image frame (corresponding to the image frame 510); e indicates the eth image frame that serves as the last image frame (corresponding to the image frame 520); $t_s$ indicates the coordinates of the logo of the trademark "abibas" in the sth image frame; $t_e$ indicates the coordinates of the logo of the trademark "abibas" in the eth image frame; and $t_i$ indicates the coordinates of the logo of the trademark "abibas" in the ith image frame, and N indicates the number of image frames. By means of Equation (3) above, the path interpolation module 550 is capable of determining the positions of the logo in the second, the third, the fourth, and the fifth image frames. The obtained positions and the name of the logo are used as the annotations of the six image frames, which, together with the six image frames, form part of a training set 560. In the embodiment shown in FIG. 5, a user only needs to annotate key frames, and the module is capable of autonomously finding the path and applying linear interpolation to determine the annotation content for the image frames between the key frames. In this way, the labeling time can be significantly reduced, and a large amount of annotation data can be created.

Figure 6:
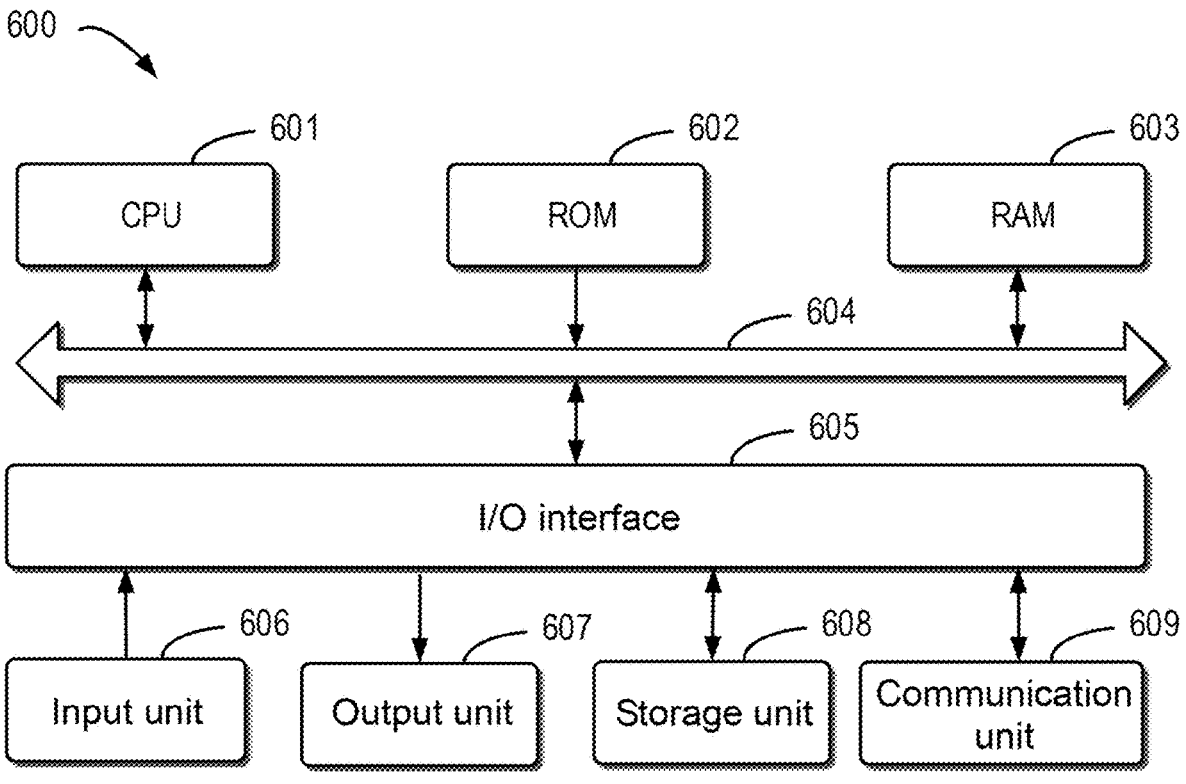
FIG. 6 is a block diagram of an example device that can be used to implement embodiments of the present disclosure.

FIG. 6 is a block diagram of an example device 600 that can be used to implement embodiments of the present disclosure. As shown in FIG. 6, the device 600 includes a central processing unit (CPU) 601 that may perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU 601, the ROM 602, and the RAM 603 are connected to each other through a bus 604. An input/output (I/O) interface 605 is also connected to the bus 604.

A plurality of components in the device 600 are connected to the I/O interface 605, including: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The various processes and processing described above, such as the method 200, may be performed by the CPU 601. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. When the computer program is loaded to RAM 603 and executed by CPU 601, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technological improvements, so as to enable persons of ordinary skill in the art to understand the various embodiments disclosed herein.

What is claimed is:

1. A method, comprising:
  detecting edges in an image based on pixels in the image, wherein the image is encoded in a first encoder;
  segmenting the image into a plurality of semantic regions based on semantics of objects in the image;
  recognizing, based on the edges and the plurality of semantic regions, object regions covering the objects, wherein the objects include at least one non-text-related object and at least one text-related object;
  encoding attributes including an object identifier and object region coordinates for the at least one non-text-related object in a second encoder different than the first encoder;

encoding attributes including an object identifier, a text meaning and object region coordinates for the at least one text-related object in the second encoder; and
  storing code data outputs of the first encoder in association with code data outputs of the second encoder;
  wherein the detecting, segmenting and recognizing comprise applying the image to each of a plurality of distinct models arranged in respective parallel branches, the plurality of distinct models including an edge detection model configured to detect the edges in the image, a text recognition model configured to detect text in the image, and a semantic segmentation model configured to identify portions of the image corresponding to at least one input semantic indicator; and
  wherein an output of the edge detection model is coupled to an input of a first residual network model, and outputs of the text recognition model, the semantic segmentation model and the first residual network model are coupled to respective inputs of a second residual network model utilized in recognizing the object regions.

2. The method according to claim 1, further comprising:
  detecting text regions in the image according to the text recognition model.

3. The method according to claim 2, wherein recognizing the object regions comprises:
  extracting edge features of the edges, semantic features of the plurality of semantic regions, and text features of the text regions;
  concatenating the edge features, the semantic features, and the text features into global features; and
  recognizing the object regions based on the global features according to a trained classification model.

4. The method according to claim 3, further comprising:
  performing a morphological transformation on the edges to make the edges continuous and enclosed.

5. The method according to claim 3, further comprising:
  extracting an image frame of an input video, the image frame comprising the image;
  acquiring an indication for a target object from a user; and
  recognizing in the image frame an object region for the target object.

6. The method according to claim 5, further comprising:
  acquiring a replacement request for the target object, the replacement request comprising a replacement object;
  removing the object region for the target object from the image frame; and
  filling a shape corresponding to the object region with the replacement object.

7. The method according to claim 5, further comprising:
  acquiring a training video comprising a set of image frames depicting continuous motion of an object;
  recognizing a first position of the object in a first image frame of the set of image frames;
  recognizing a second position of the object in a second image frame of the set of image frames;
  determining a set of positions of the object in image frames between the first image frame and the second image frame based on the first position, the second position, and the continuous motion;
  annotating positions of the object in the set of image frames based on the first position, the second position, and the set of positions to obtain a set of training data; and
  training the classification model using the set of training data.

8. The method according to claim 1, wherein detecting the edges comprises:

detecting the edges in the image based on values of the pixels in the image according to the edge detection model, with differences of values of the pixels at two sides of the edges being greater than a predetermined pixel threshold.

9. The method according to claim 1, wherein segmenting the image into the plurality of semantic regions comprises:

segmenting the image into the plurality of semantic regions based on at least one category of at least one of the objects according to the semantic segmentation model.

10. An electronic device, comprising:

at least one processor; and memory coupled to the at least one processor, the memory having instructions stored therein, wherein the instructions, when executed by the at least one processor, cause the electronic device to perform actions comprising:

detecting edges in an image based on pixels in the image, wherein the image is encoded in a first encoder;

segmenting the image into a plurality of semantic regions based on semantics of objects in the image;

recognizing, based on the edges and the plurality of semantic regions, object regions covering the objects, wherein the objects include at least one non-text-related object and at least one text-related object;

encoding attributes including an object identifier and object region coordinates for the at least one non-text-related object in a second encoder different than the first encoder;

encoding attributes including an object identifier, a text meaning and object region coordinates for the at least one text-related object in the second encoder; and storing code data outputs of the first encoder in association with code data outputs of the second encoder;

wherein the detecting, segmenting and recognizing comprise applying the image to each of a plurality of distinct models arranged in respective parallel branches, the plurality of distinct models including an edge detection model configured to detect the edges in the image, a text recognition model configured to detect text in the image, and a semantic segmentation model configured to identify portions of the image corresponding to at least one input semantic indicator; and wherein an output of the edge detection model is coupled to an input of a first residual network model, and outputs of the text recognition model, the semantic segmentation model and the first residual network model are coupled to respective inputs of a second residual network model utilized in recognizing the object regions.

11. The electronic device according to claim 10, wherein the actions further comprise:

detecting text regions in the image according to the text recognition model.

12. The electronic device according to claim 11, wherein recognizing the object region comprises:

extracting edge features of the edges, semantic features of the plurality of semantic regions, and text features of the text regions;

concatenating the edge features, the semantic features, and the text features into global features;

recognizing the object regions based on the global features according to a trained classification model.

13. The electronic device according to claim 12, wherein the actions further comprise:

extracting initial features of the edges; and denoising the edges based on the initial features to make the edges continuous and enclosed.

14. The electronic device according to claim 12, wherein the actions further comprise:

extracting an image frame of an input video, the image frame comprising the image;

acquiring an indication for a target object from a user; and recognizing in the image frame an object region for the target object.

15. The electronic device according to claim 14, wherein the actions further comprise:

acquiring a replacement request for the target object, the replacement request comprising a replacement object;

removing the object region for the target object from the image frame; and filling a shape corresponding to the object region with the replacement object.

16. The electronic device according to claim 14, wherein the actions further comprise:

acquiring a training video comprising a set of image frames depicting continuous motion of an object;

recognizing a first position of the object in a first image frame of the set of image frames;

recognizing a second position of the object in a second image frame of the set of image frames;

determining a set of positions of the object in image frames between the first image frame and the second image frame based on the first position, the second position, and the continuous motion;

annotating positions of the object in the set of image frames based on the first position, the second position, and the set of positions to obtain a set of training data; and training the classification model using the set of training data.

17. The electronic device according to claim 10, wherein detecting the edges comprises:

detecting the edges in the image based on values of the pixels in the image according to the edge detection model, with differences of values of the pixels at two sides of the edges being greater than a predetermined pixel threshold.

18. The electronic device according to claim 10, wherein segmenting the image into the plurality of semantic regions comprises:

segmenting the image into the plurality of semantic regions based on at least one category of at least one of the objects according to the semantic segmentation model.

19. A computer program product, the computer program product comprising a non-transitory computer-readable medium having machine-executable instructions stored therein, wherein the machine-executable instructions, when executed by a machine, cause the machine to perform actions comprising:

detecting edges in an image based on pixels in the image, wherein the image is encoded in a first encoder;

segmenting the image into a plurality of semantic regions based on semantics of objects in the image;

recognizing, based on the edges and the plurality of semantic regions, object regions covering the objects, wherein the objects include at least one non-text-related object and at least one text-related object;

encoding attributes including an object identifier and object region coordinates for the at least one non-text-related object in a second encoder different than the first encoder;

encoding attributes including an object identifier, a text meaning and object region coordinates for the at least one text-related object in the second encoder; and storing code data outputs of the first encoder in association with code data outputs of the second encoder;

wherein the detecting, segmenting and recognizing comprise applying the image to each of a plurality of distinct models arranged in respective parallel branches, the plurality of distinct models including an edge detection model configured to detect the edges in the image, a text recognition model configured to detect text in the image, and a semantic segmentation model configured to identify portions of the image corresponding to at least one input semantic indicator; and wherein an output of the edge detection model is coupled to an input of a first residual network model, and outputs of the text recognition model, the semantic segmentation model and the first residual network model are coupled to respective inputs of a second residual network model utilized in recognizing the object regions.

20. The computer program product according to claim 19, wherein the machine-executable instructions, when executed by the machine, further cause the machine to perform additional actions comprising:

detecting text regions in the image according to the text recognition model.

\* \* \* \* \*